Patented Aug. 2, 1949

2,477,742

UNITED STATES PATENT OFFICE 2,477,742

GELATIN-BASE COATING FOR FOOD AND THE LIKE

Lloyd A. Hall, Chicago, Ill., assignor to The Griffith Laboratories, Inc., Chicago, Ill., a corporation of Illinois No Drawing. Application March 1, 1945, Serial No. 580,477

8 Claims. (Cl. 99—166)

This invention relates to protective coatings and particularly to edible coatings to be used on foodstuffs such as meats, fruits, vegetables, other food products, food cartons, carton stock, and other articles and materials used in the food industry.

The problem of coating food materials, in particular meats, such as hams, butts, sausage, bacon, baked wares, and packaged fatty products like lard, butter and margarine, has received much attention, primarily due to the increased demands for sanitary products for storage and for shop display, and also because of import and export trade calling for protection against severe changes in climatic conditions, exposure to flies, insects, micro-organisms, dirt, and other factors.

Although there is a large number of materials which are available for coating food products, there are serious practical and conflicting restrictions against their use. Waxes, in particular, paraffin wax and other commercial waxes, have been used for coating for many years. These waxes are not edible. They have not been satisfactory because they are not entirely impervious to air and are subject to breaking and cracking in handling and transporting. They are also subject to crumbling and breaking away from the foods on cutting or slicing, and constitute, therefore, a unsuspected danger of food contamination with the coating material.

Gelatin has been used as a coating material for food products and in certain instances has been a practical and successful protecting agent. In most instances, however, when gelatin has been used in a hot bath there has been a loss in gelatin strength due to hydrolysis of the gelatin material in solution form. Because gelatin is a good culture medium for yeasts, molds and bacteria, these may readily grow in and on the gelatin coating, making it as objectionable as if the food product had not been coated at all. Because of U. S. Federal restrictions, it has heretofore not been permitted in the United States to treat a gelatin coating on food products with certain suitable chemicals to make it mold and bacteria proof, or, to use certain well known chemicals to harden the gelatin, all of which are undesirable, and many of which are toxic.

According to U. S. Patent No. 1,914,351, in which the present applicant is a joint-patentee, there was developed a fairly satisfactory protective coating using gelatin. This patent described a procedure wherein foodstuffs were coated by a dipping process to form a multi-layer skin coating which was impervious to atmospheric conditions and fly-sting, and readily huskable from the article coated.

Gelatin-base coating compositions used heretofore have provided coatings serving as good culture media for yeasts, mold and bacteria. Also, in practical use of such compositions, it has been impossible to hold-over dipping baths of such compositions, as from use on one day to use on the next day, because the first day's use contaminates the bath with micro-organisms, which multiply therein overnight. To hold such baths at a sterilizing heat, effects degradation of the gelatin therein, thereby impairing the coating of its next use, and limiting the time of use of the bath. The impairment lowers the viscosity, which should be high for forming a good coating by dipping.

The present invention overcomes all these difficulties and provides a gelatin bath and coat, which inhibit the growth of infecting micro-organisms, such as yeasts, molds and bacteria, which resists degradation by heating; and which can be used for numerous reheatings over a prolonged period of time.

It is the general object of my invention to provide an improved gelatin-base coating.

It is a particular object of the invention to provide a gelatin-base coating which is resistant to micro-organisms.

It is also an object to provide a gelatin-base coating material which can be set and remelted numerous times without loss of its viscosity characteristics when melted and without loss of its film strength when set.

It is a particular object to provide gelatin-coated meat or meat products, such as hams, which can be stored for long periods at the usual cold storage temperatures just above 32° F. (0° C.) without danger of unsightly change in the gelatin coat by the growth of mold, yeast or bacteria.

Numerous other and ancillary objects and advantages of the invention will appear from the following description and explanation of the invention.

Gelatin by itself provides a rather brittle coating, and to avoid this, heretofore, a quantity of glycerine has been added, giving flexibility and elasticity. In said prior Patent No. 1,914,351, 20 parts of glycerine were used to 100 parts of gelatin to produce a flexible elastic adherent film adjacent food, such as the surface of a ham. However, less usage of glycerine is known with corresponding lessening of its plasticizing effect. But even with 20% of glycerine, it was necessary to add a sterilizing agent to avoid mold growth on coated articles, or mold growth in a dipping bath held overnight.

I have discovered that when propylene glycol is used in a gelatin composition at and above a certain content, a gelatin-film-forming composition and resulting film or coat may be made, which are resistant to the growth of infecting yeasts, molds and bacteria. Propylene glycol is, as of this date, permitted by U. S. Federal regulations, as an ingredient in association with food, but insofar as I know, it is not known to exhibit an inhibiting action on the growth of micro-organisms in a gelatin medium.

The composition of this invention is merely an inhibited mass as to growth to colony formation of any content of yeasts, molds and bacteria. When an inhibited mass is diluted with sterile water and cultured, the inhibited microorganisms develop, but only when the content of propylene glycol in the culture medium is below about 15% by weight. I have determined that a content of about 15% by weight of propylene glycol is the lower critical limit for inhibition of microorganisms. An upper limit of about 20% content of propylene glycol is not critical as to said inhibition, but is imposed only because of undesired physical effects for the present invention. When more than about 20% by weight of propylene glycol is present, the gelatin film or coat is too soft for the conditions to which it is designed to be subjected.

Thus, a desirable film-coating for food and food packages becomes available. The resistance of the bath composition to damage by supporting the growth of yeasts, molds or bacteria, permits the bath to be used over and over; but to avoid degradation of the bath by such hold-over use, it is made resistant to degradation by heat, as another feature of the present invention, by adjustment of its pH. Useful grades of gelatin have normal pH values ranging from 4.0 to 5.5. This acidity initiates and accelerates degradation in heating unbuffered fluid aqueous gelatin compositions. Acidity is increased by such degradation. I have found that by suitable adjustment of the pH to neutrality or just below it, as in the range from pH 6.5 to 7, the composition is stable for long periods, without losing its desired viscosity characteristics, when maintained heated to a coating fluidity, or when numerous times cooled to set it and reheated to liquify it. A composition adjusted to a pH in the range of 6.5 to 7 and containing said minimum effective quantity of propylene glycol, exhibits the desired resistance to the growth of yeasts, molds and bacteria. Many neutralizing or buffering agents may be used, including soluble ones and even insoluble ones, such as insoluble calcium carbonate. However, for food products, edible and soluble neutralizing or buffering agents are preferred, such as alkanol amines, preferably triethanol amine, sodium carbonate, sodium bicarbonate and disodium phosphate.

Triethanolamine is preferred to inorganic agents. It is not a strong electrolyte, and it does not impart ash content to the coating. It is less likely to migrate from the coating in contact with moist food, such as meat.

Reducing sugar may be employed in the composition as a protective agent, particularly to act as an anti-oxidant for gelatin. Where the composition as a bath may be reheated numerous times, as described, there is a tendency for oxidation of gelatin to occur, producing an acid condition. Although the presence of the buffering agent will counteract such acid, it is preferred to minimize the amount of such buffering agent by providing such anti-oxidant. Too much sugar (over about 10%) causes tackiness in the film. Up to a content of 10%, the reducing sugar does not interfere with the characteristics of non-tackiness, viscosity, keeping, or resistance to growth of microorganisms. Forms of sugar containing trace impurities of acid, such as commercial grades of corn sugar, may be used without danger to the gelatin, when alkaline agent, neutralizing agent, or buffering agent is present. Suitable reducing sugars are dextrose, lactose, and maltose. Sugar may be omitted if desired, and especially where the composition is used in a manner not subjecting the gelatin content to prolonged heating, as for example, when coating carton stock. In such practice dipping baths are not commonly required and hence are not held over and remelted.

Gelatin is available in numerous grades commercially containing from 8% to 10% of water content. Edible gelatin varies in grade by a "Bloom" number, being commonly in the range from 125 to 300 Bloom. The lower the Bloom number, the softer the gel formed by it and the less viscous a solution of it. Thus, the higher the Bloom number, the less gelatin and the more water, which may be used in preparing the compositions. The liquid compositions of the present invention are such as to provide one which sets on cooling and liquifies on heating, with little loss of water from the set composition.

In the following examples, parts are given by weight.

| Example | 1 | 2 | 3 | 4 | 5 |
| --- | --- | --- | --- | --- | --- |
| Edible Gelatin (200 Bloom) | 32 | | 32 | 32 | 32 |
| Edible Gelatin (250 Bloom) | | 30 | | | |
| Dextrose (or other Reducing Sugar) | 4 | 4 | 4 | 4 | 4 |
| Propylene Glycol | 20 | 18 | 18 | 16 | 15 |
| Triethanolamine | 1 | 1 | | 1 | 1 |
| Disodium Phosphate Dihydrate | | | 1.5 | | |
| Water (Tap—pH 5.8 to 6) | 48.7 | 54.1 | 45.8 | 52.0 | 53 |
| pH | 6.8 | 7.0 | 6.5 | 6.8 | 6.6 |

In the above examples, the propylene glycol is respectively 19%, 16.8%, 17.3%, 15.5% and 14.3% of the ingredients listed. However, in large batches where the parts given are in pounds, there is during the time of processing, an evaporation of water. Example 1, yields 100 lbs. of liquid composition. Water may be added as necessary, or evaporated, or the amount varied, so long as the content of propylene glycol is maintained to provide about or substantially 15% or more by weight. Thus, Example 5 has only 14.3% of propylene glycol in the ingredients listed, but the loss of about 5 parts of water gives approximately 15% content of propylene glycol in the composition to be used.

The neutralizing, buffering or alkaline agent is added in quantity to give a pH in the range from 6.5 to 7.

In Example 2, the film constitution as to gelatin and water has 31.6%, or 32.1% by weight of 100%-dry gelatin, respectively, as the original gelatin of the formula has 8% or 10% of water. Likewise, in Example 3, the content of 100%-dry gelatin with respect to the total of gelatin and water is either 37.8% or 37%. These are the extremes of the disclosures in Examples 1 to 5 with respect to the ratio of gelatin to water. In general these proportions fall within a range of 170 to 215 parts by weight of water to 100 parts of 100%-dry gelatin.

In making the composition, the gelatin and propylene glycol are made into a substantially uniform mixture. The water, pH controlling agent, and any dextrose or the like, are made into one solution, which is added to the mix of gelatin and propylene glycol. The mass is heated in a steam or hot-water jacketed kettle to a temperature in the range from 140° to 155° F., until fluid, transparent and uniform. Agitation forming froth is avoided to keep bubbles of air out of the mix.

The mixture cooled from this temperature sets. On heating it melts. Thus, articles may be dipped in the hot bath at 140° to 155° F., drained and cooled. The viscosity of the fluid is such as to form a suitable heavy film, on a ham for instance. By limiting the prevailing temperature to 140° to 155° F., the mixture may be cooled and heated many times, over a period of 60 days, without loss of a desirable film-forming viscosity. Of course, for short periods, the mixture may be at higher temperatures, but for substantial safety over long periods to time, 155° F. is recommended as an upper limit.

With respect to the composition of Example 1, the following comparisons evidence the value of the invention.

(1) Over a period of 30 days, the composition was remelted every day at 140° to 150° F., and the viscosity (Stormer) varied from 165.4 to 128. A like composition without the triethanolamine similarly treated changed in viscosity from 73.4 to 28.6.

(2) The composition was inoculated by adding some paprika having a count of 68,533,000 bacteria per gram, and a count of 105 yeast and mold spores per gram. When the thus-infected gelatin composition was incubated at 55°, 37° and 0° C., no colonies of yeasts, or of molds, or of bacteria developed.

(3) Into a coating solution at 120° F. (49° C.) was added black pepper having a count of 42,566,000 bacteria per gram, and a count of 230 of yeasts and molds per gram. This was incubated at 37° C., and at 0° C., and no colonies developed.

(4) Hams dipped into the composition were hung at 38° to 40° F. for four months without developing yeast or mold growth on the surface, thus presenting a clean and saleable appearance.

(5) Duplication of the composition and tests 1, 2, 3 and 4, above, omitting the propylene glycol, produced heavy colonies of yeasts, molds and bacteria in each instance. Also, like compositions with only 10% and 12½% by weight of propylene glycol, incubated at 0° and 37° C., gave abundant growth of mold, obscuring the test plates for bacteria counts. The growth at 12½% was less than at 10%.

The composition as a coating has been in contact with contaminating foods, such as meats and sausage, for as long as six months, while retaining its property of inhibiting the growth of microorganisms.

The composition is resistant to oils, fats and greases, and serves as an excellent coating for paper and carton stock, for cheese, lard, butter, margarine and like fatty foods. Being elastic, it is an improvement over wax in such uses, as it does not crack or peel, and therefore, resists transmission not only of fat in one direction, but of contamination in both directions.

It is to be appreciated that the desirable high viscosity is pertinent to use in dipping operations. Where coating operations of a different sort, as by a coating roller on paper stock, are used, high viscosity is not so important. In such cases, the pH-controlling agent may be omitted, and the solution prepared as quickly as possible to minimize degradation. The reducing sugar may be omitted also in this circumstance, as well as in cases where the pH is adjusted to 6.5 to 7.

Numerous variations in compositions and uses may be practiced without departing from the spirit and scope of the invention as expressed in the appended claims.

I claim:

1. A coating composition for association with foods and packages therefor, comprising essentially water and edible food gelatin in the proportion by weight of 170 to 215 parts of water to 100 parts of 100%-dry gelatin, a pH-controlling agent, and propylene glycol, said composition being normally solid but liquid at a temperature in the range from 140° to 155° F., and being characterized on cooling a liquid coat thereof by setting to a plastic film having from about 15% to about 20% by weight of propylene glycol, the content of pH-controlling agent being such as to impart to said film a pH in the range from 6.5 to 7.

2. A coating composition for association with foods and packages therefor, comprising essentially water and edible food gelatin in the proportion by weight of 170 to 215 parts of water to 100 parts of 100%-dry gelatin, a pH-controlling agent, a water-soluble reducing sugar, and propylene glycol, said composition being normally solid but liquid at a temperature in the range from 140° to 155° F., and being characterized on cooling a liquid coat thereof by setting to a plastic film having from about 15% to about 20% by weight of propylene glycol, the content of pH-controlling agent being such as to impart to said film a pH in the range from 6.5 to 7.

3. A non-tacky adherent film composition comprising water and gelatin in the proportion by weight of 170 to 215 parts of water to 100 parts of 100%-dry gelatin, a pH-controlling agent, and propylene glycol, the latter being present in quantity from about 15% to about 20% by weight, and the composition having a pH in the range from 6.5 to 7.

4. A non-tacky adherent film composition comprising water and gelatin in the proportion by weight of 170 to 215 parts of water to 100 parts of 100%-dry gelatin, a pH-controlling agent, water-soluble reducing sugar, and propylene glycol, the latter being present in quantity from about 15% to about 20% by weight, and the composition having a pH in the range from 6.5 to 7, the sugar being limited in quantity to avoid tackiness of the composition.

5. A coating composition for association with foods and packages therefor, comprising essentially water and edible food gelatin in the proportion by weight of 170 to 215 parts of water to 100 parts of 100%-dry gelatin, and propylene glycol, said composition being normally solid but liquid at a temperature in the range from 140° to 155° F., and being characterized on cooling a liquid coat thereof by setting to a plastic film having about 15% to about 20% by weight of propylene glycol.

6. A gelatin-base composition having in gel-film form and by weight from 170 to 215 parts of water to 100 parts of 100%-dry gelatin, and from about 15% to about 20% of propylene glycol, and characterized by inhibition of the growth of microorganisms at temperatures above 0° C.

7. A gelatin-base composition having by weight from 170 to 215 parts of water to 100 parts of 100%-dry gelatin, and from about 15% to about 20% of propylene glycol, and characterized by inhibition of the growth of microorganisms at temperatures above 0° C.

8. A liquid coating composition for food and food materials, which comprises a solution of edible gelatin in water having a content of water to produce a composition which liquifies in the range from 140° to 155° F. and which solidifies on cooling from said temperature to form a protective solid film at normal temperatures, said composition containing from 15% to 20% by weight of propylene glycol, and having an agent therein to adjust the composition to a pH in the range from 6.5 to 7, whereby said composition may be maintained for long periods of time at temperatures in the range from 140° to 155° F. in liquid form without danger of hydrolysis with consequent loss of suitable viscosity for coating, and may be alternately heated and cooled without danger of supporting growth of yeasts, molds and bacteria.

LLOYD A. HALL.

REFERENCES CITED

The following references are of record in the file of this patent:

UNITED STATES PATENTS

| Number | Name | Date |
| --- | --- | --- |
| 1,148,823 | Bocande | Aug. 3, 1915 |
| 1,853,151 | Segur et al. | Apr. 12, 1932 |
| 1,914,351 | Hall et al. | June 13, 1933 |
| 2,021,137 | Stone | Nov. 19, 1935 |
| 2,051,170 | Helfrich | Aug. 18, 1936 |
| 2,333,124 | Robertson et al. | Nov. 2, 1943 |